(12) United States Patent
Rajagopal et al.

(10) Patent No.: US 10,346,896 B1
(45) Date of Patent: Jul. 9, 2019

(54) SYSTEMS AND METHODS FOR TRANSACTION-BASED REAL TIME PRE-INTENT RECOMMENDATIONS FOR A SEQUENTIAL PURCHASE

(71) Applicant: Capital One Services, LLC, McLean, VA (US)

(72) Inventors: Sandeep Rajagopal, Danville, CA (US); Jennifer Lopez, New York, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 15/843,954

(22) Filed: Dec. 15, 2017

(51) Int. Cl.
*G06Q 30/00* (2012.01)
*G06Q 30/06* (2012.01)
*G06Q 20/20* (2012.01)
*G06Q 10/02* (2012.01)

(52) U.S. Cl.
CPC ......... *G06Q 30/0631* (2013.01); *G06Q 20/20* (2013.01); *G06Q 10/02* (2013.01)

(58) Field of Classification Search
CPC ............... G06Q 30/00; G06Q 30/0601; G06Q 30/0613; G06Q 30/0623; G06Q 30/0629; G06Q 30/0631
See application file for complete search history.

(56) References Cited

U.S. PATENT DOCUMENTS

| | | | |
|---|---|---|---|
| 6,611,881 B1 | 8/2003 | Gottfurcht et al. | |
| 6,853,982 B2 | 2/2005 | Smith et al. | |
| 7,702,318 B2 | 4/2010 | Ramer et al. | |
| 7,720,723 B2 | 5/2010 | Dicker et al. | |
| 8,386,336 B1 * | 2/2013 | Fox ................... | G06Q 30/0253 705/26.1 |
| 9,558,504 B2 | 1/2017 | Loomis | |
| 2001/0021914 A1 * | 9/2001 | Jacobi ................... | G06Q 30/02 705/14.53 |

(Continued)

OTHER PUBLICATIONS

Schafer, J. Ben, Joseph A. Konstan, and John Riedl. "E-commerce recommendation applications." Data mining and knowledge discovery 5.1-2 (2001): 115-153. (Year: 2001).*

(Continued)

*Primary Examiner* — Christopher B Seibert
(74) *Attorney, Agent, or Firm* — Troutman Sanders LLP; Christopher J. Forstner; John A. Morrissett

(57) ABSTRACT

A method for providing a real-time purchase recommendation includes receiving customer profile data associated with a customer and authorization request data associated with a request to authorize an attempted purchasing using a financial account associated with the customer. The method includes determining attempted purchase data including an identity of a merchant, a merchant location, and a purchase category associated with the attempted purchase. The method includes generating a sequential purchase recommendation based on the attempted purchase data, wherein the sequential purchase recommendation is a real-time recommendation for one or more goods or services for future purchase sequentially following the attempted purchase. The method further includes transmitting a message including the sequential purchase recommendation to a customer computing device associated with the customer.

8 Claims, 7 Drawing Sheets

(56) References Cited

U.S. PATENT DOCUMENTS

| | | | |
|---|---|---|---|
| 2009/0110089 A1* | 4/2009 | Green | H04L 5/0037 |
| | | | 375/260 |
| 2009/0172021 A1 | 7/2009 | Kane et al. | |
| 2010/0268661 A1* | 10/2010 | Levy | G06Q 30/02 |
| | | | 705/347 |
| 2010/0324985 A1* | 12/2010 | Kumar | G06Q 10/04 |
| | | | 705/14.25 |
| 2013/0046634 A1* | 2/2013 | Grigg | G06Q 30/00 |
| | | | 705/14.58 |
| 2014/0358660 A1 | 12/2014 | Poole et al. | |

OTHER PUBLICATIONS

Liu, Duen-Ren, Chin-Hui Lai, and Wang-Jung Lee. "A hybrid of sequential rules and collaborative filtering for product recommendation." Information Sciences 179.20 (2009): 3505-3519. (Year: 2009).*

* cited by examiner

SYSTEMS AND METHODS FOR TRANSACTION-BASED REAL TIME PRE-INTENT RECOMMENDATIONS FOR A SEQUENTIAL PURCHASE

FIELD OF INVENTION

The present disclosure relates to systems and methods for providing a real-time purchase recommendation, and more particularly providing a sequential purchase recommendation based on a recent transaction associated with a customer account.

BACKGROUND

Consumers often make purchasing decisions based on recommendations provided by others. Typically, recommendations are either proactively solicited by a consumer after the consumer has formed an intent to engage in a particular activity by asking friends and performing intent searches or the consumer passively receives unintended recommendations through advertisements. However, if a consumer is visiting a new city, the consumer may not be aware of what goods, services, activities, restaurants, merchants, or other establishments are offered by the city, thereby reducing their ability to form the intent to seek out a particular type of activity. Further, some consumers may appreciate receiving recommendations for activities that people who have similar spending habits or people of a similar demographic may enjoy, and although such recommendation systems may exist with regard to certain products, these systems do not provide actionable suggestions in real time without the consumer having requested or searched for such a recommended activity.

An innate difficulty in providing real time recommendations is that it may be difficult to determine when a consumer is on the verge of changing states from one activity to the next, and therefore it may be very hard to provide a timely, actionable recommendation to a consumer. For example, a recommendation system cannot provide an immediately actionable recommendation for a post-dinner activity in real time without knowing that the consumer has finished their dinner. However, purchase authorization systems such as credit and debit card authorization systems may be leveraged to provide an indication of when a consumer has finished one activity and may be open to transitioning to another activity. Further, such systems may provide information regarding the type and location of activity that the consumer has just paid for, which may be useful in determining what activity to recommend next.

Accordingly, there is a need for improved systems and methods for providing real time purchase recommendations that can provide a real-time recommendation to a user based on the user's most recent transaction. Embodiments of the present disclosure are directed to this and other considerations.

SUMMARY

Disclosed embodiments provide systems and methods for providing real-time purchase recommendations.

Consistent with the disclosed embodiments, a method for providing a real-time purchase recommendation may include receiving customer profile data associated with a customer. The customer profile data may include one or more of demographic information about the customer, customer preferences, and historical transaction information of the customer. The method may include receiving, from an authorization terminal, authorization request data associated with a request to authorize an attempted purchase using a financial account associated with the customer. The authorization request data may include an authorization decision indicating whether the attempted purchase has been authorized. The method may further include determining, based on the authorization request data, attempted purchase data associated with the attempted purchase. The attempted purchase data may include an identity of a merchant associated with the attempted purchase, a merchant location associated with the attempted purchase, and a purchase category associated with the attempted purchase. The method may include generating, based on one or more of the merchant location, the purchase category, and the customer profile data, a sequential purchase recommendation for the customer. The sequential purchase recommendation may include a real-time recommendation for one or more goods or services for future purchase sequentially following the attempted purchase. The method may further include transmitting a message comprising an indication of the authorization decision and the sequential purchase recommendation to a customer computing device associated with the customer.

Consistent with the disclosed embodiments, systems and non-transitory computer readable mediums for providing real-time purchase recommendations are also disclosed.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
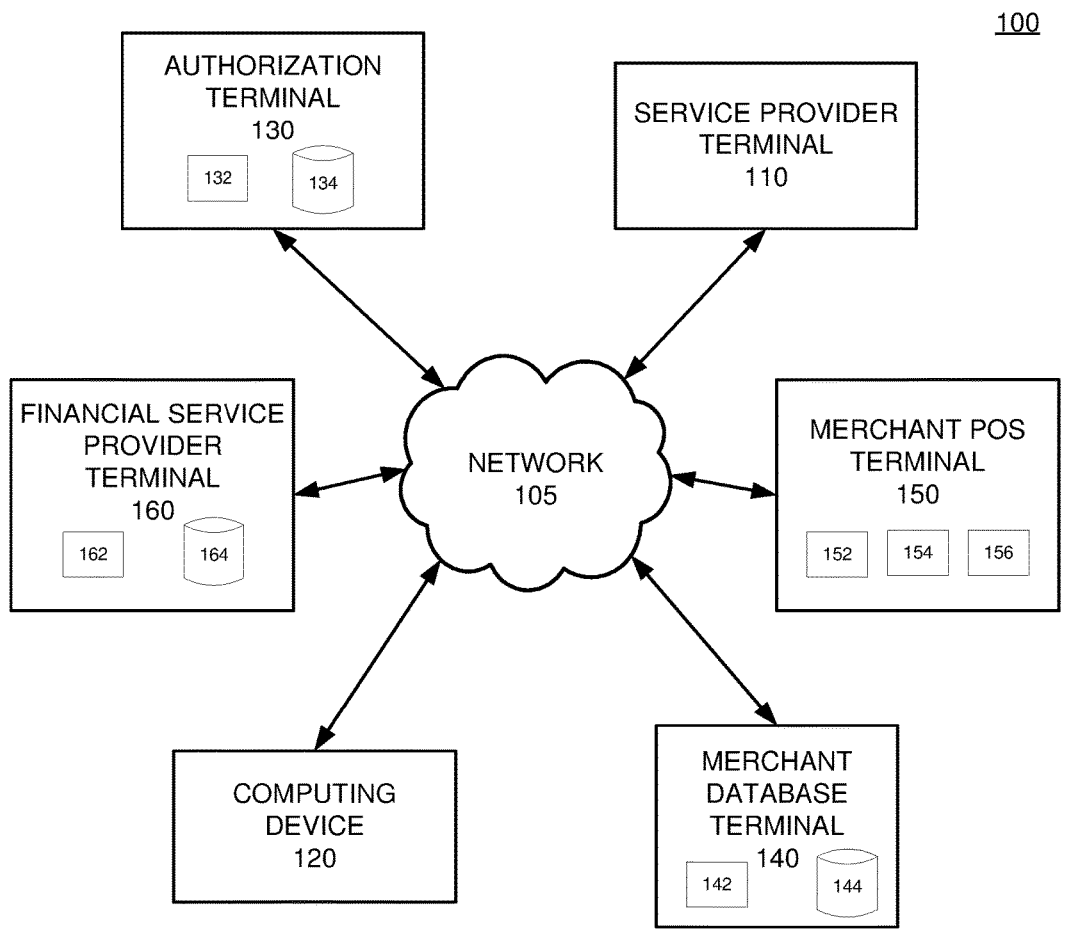
FIG. 1 is a diagram of an exemplary system that may be used to provide a real-time purchase recommendation.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to methods for providing a real-time purchase recommendation. In one embodiment, a method may include receiving customer profile data associated with a customer. The customer profile data may include one or more of demographic information about the customer, customer preferences, and historical transaction information of the customer. The method may include receiving, from an authorization terminal, authorization request data associated with a request to authorize an attempted purchase using a financial account associated with the customer. The authorization request data may include an authorization decision indicating whether the attempted purchase has been authorized. The method may further include determining, based on the authorization request data, attempted purchase data associated with the attempted purchase. The attempted purchase data may include an identity of a merchant associated with the attempted purchase, a merchant location associated with the attempted purchase, and a purchase category associated with the attempted purchase. The method may include generating, based on one or more of the merchant location, the purchase category, and the customer profile data, a sequential purchase recommendation for the customer. The sequential purchase recommendation may include a real-time recommendation for one or more goods or services for future purchase sequentially following the attempted purchase. The method may further include transmitting a message comprising an indication of the authorization decision and the sequential purchase recommendation to a customer computing device associated with the customer.

In another embodiment, another method for providing a real-time purchase recommendation is disclosed. The method may include determining a plurality of connected category purchase pairs. Each connected category purchase pair may include a trigger purchase category and a connected purchase category. The method may include receiving, from an authorization terminal, authorization request data associated with a request to authorize an attempted purchase using a financial account associated with the customer. The authentication request data may include an authorization decision indicating whether the attempted purchase has been authorized. The method may include determining, based on the authorization request data, a point-of-sale location associated with the attempted purchase and a purchase category associated with the attempted purchase. The method may include identifying a subset of the plurality of connected category purchase pairs, wherein the trigger purchase category of each connected purchase pair of the subset matches the purchase category associated with the attempted purchase. The method may further include generating, based on the subset of the plurality of connected purchase pairs, a purchase recommendation for the customer, wherein the purchase recommendation may include a recommendation for a sequential purchase that corresponds to the connected purchase category of one of the subset of the plurality of connected purchase pairs. The method may further include transmitting a message comprising an indication of the authorization decision and the purchase recommendation to a customer computing device associated with the customer.

In another embodiment, another method for providing a real-time purchase recommendation is disclosed. The method may include receiving, customer profile data associated with a customer and merchant information associated with a plurality of merchants. The customer profile data may include demographic information about the customer. The method may include receiving customer segmentation data including a plurality of customer segments. Each customer segment may represent a particular customer demographic and spending habits associated with the particular customer demographic. The method may include receiving purchase request data associated with a purchase made at a point-of-sale location associated with a merchant using an account associated with the customer. The purchase request data may include a merchant name associated with the merchant, merchant location information associated with the merchant, a time stamp indicative of the date and time of the purchase, a purchase value indicative of a cost of the purchase, and a merchant category and code indicative of the type of purchase. The method may further include determining, based on the purchase request data, the point-of-sale location associated with the purchase and a category of the purchase. The method may further include determining, based on the category of the purchase, one or more suggested recommendations, wherein each of the one or more suggested recommendations may be associated with a connected category of a type of purchase. The method may further include prioritizing the one or more suggested recommendations based on the time stamp and the customer profile. The method may further include responsive to identifying a number of the most highly prioritized suggested recommendations, ranking a subset of the plurality of merchants based on their proximity to the point-of-sale location. Each of the subset of the plurality of merchants may offer goods or services that correspond to the connected category of the type of purchase associated with the number of the mostly highly prioritized suggested recommendations. The method may further include generating a sequential purchase recommendation that may represent a real-time recommendation to make a purchase at a recommended merchant. The recommended merchant may correspond to the most highly ranked merchant of the subset of merchants. The method may further include transmitting the purchase recommendation to a computing device associated with the customer.

In another embodiment, a system may include one or more memory devices storing instructions, and one or more processors configured to execute the instructions to perform steps of a method of providing a real-time purchase as disclosed herein.

In another embodiment, a non-transitory computer-readable medium is disclosed. The non-transitory computer-readable medium may store instructions that, when executed by one or more processors, cause a system to execute a method of providing a real-time purchase recommendation as disclosed herein.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 is a diagram of an exemplary system that may be configured to perform one or more processes that can provide a real-time purchase recommendation to a computing device associated with a customer in response to a recent attempted purchase by the customer. For example, a real-time purchase recommendation system 100 may utilize authorization request data associated with a purchase, such as a credit card purchase, to determine what type of activity the customer is currently engaged in and make a recommendation for a complementary activity or purchase that may conveniently immediately follow the current activity. For example, if real-time purchase recommendation system 100 determines that the customer has just checked into a hotel, system 100 may provide a real-time recommendation for the customer to visit a nearby restaurant for dinner. In another example, if real-time purchase recommendation system 100 determines that the customer has just arrived at an airport (for example, by virtue of the customer making a purchase from an airport vendor), system 100 may provide a real-time recommendation for a transportation service. By using authorization request data to generate recommendations, system 100 may be enabled to determine that the customer has just concluded (or will imminently conclude) a first activity, such as checking into a hotel, finishing dinner at a restaurant, purchasing items at a grocery store, and the like, which may enable system 100 to provide the customer with a recommendation for a complementary second activity that may be delivered to the customer and acted upon by the customer immediately. Thus, system 100 may beneficially provide real-time purchase recommendations to customers at a time when the customer may immediately act on the recommendation, without the need for the customer to solicit the recommendation. System 100 may also beneficially provide customers with recommendations for purchases or activities that the customer was not aware existed or had not thought to seek out on their own. Further, system 100 may customize recommendations to individuals based on their own preferences, spending habits, and/or based on the behavior of other people with similar preferences, spending habits, demographics and the like. The components and arrangements shown in FIG. 1 are not intended to limit the disclosed embodiments as the components used to implement the disclosed processes and features may vary.

In accordance with disclosed embodiments, real-time purchase recommendation system 100 may include a service provider terminal 110 and a computing device 120 in communication with an authorization terminal 130 via network 105. In some embodiments, service provider terminal 110 may also be in communication with a merchant database terminal 140, a merchant POS terminal 150, and/or a financial service provider terminal 160 via network 105. Computing device 120 may be a mobile computing device (e.g., a smart phone, tablet computer, smart wearable device, portable laptop computer, voice command device, wearable augmented reality device, or other mobile computing device).

In some embodiments, real-time purchase recommendation system 100 may connect each of service provider terminal 110, computing device 120, authorization terminal 130, merchant database terminal 140, merchant POS terminal 150, and financial service provider terminal 160 to one or more the other devices of real-time purchase recommendation system 100 via network 105. Although represented separately in FIG. 1, according to some embodiments, some or all of the functions of service provider terminal 110, authorization terminal 130, and financial service provider terminal 160 may be combined into one device. Similarly, in some embodiments, some or all of the functions of merchant database terminal 140 and merchant POS terminal may be combined into a single device.

Network 105 may be of any suitable type, including individual connections via the internet such as cellular or WiFi networks. In some embodiments, network 105 may connect terminals using direct connections such as radio-frequency identification (RFID), near-field communication (NFC), Bluetooth™, low-energy Bluetooth™ (BLE), WiFi™, ZigBee™, ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
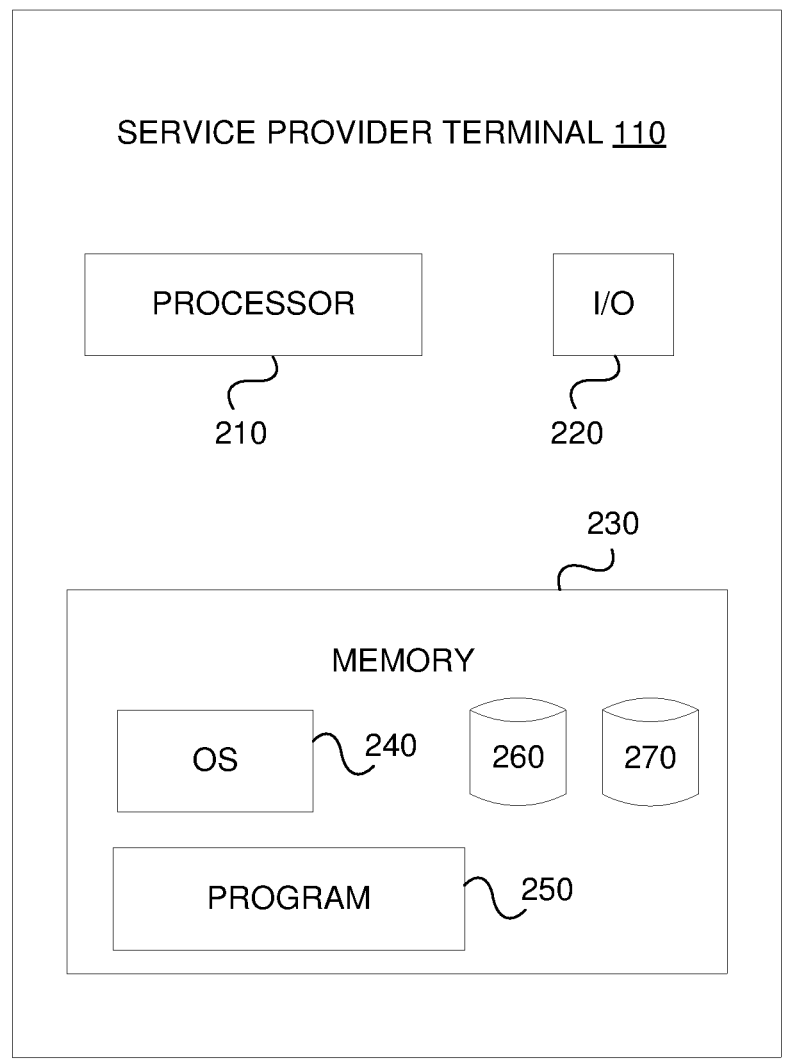
FIG. 2 is a component diagram of a service provider terminal.

An exemplary embodiment of service provider terminal 110 is shown in more detail in FIG. 2. Computing device 120, authorization terminal 130, merchant database terminal 140, merchant POS terminal 150, and financial service provider terminal 160 may have a similar structure and components that are similar to those described with respect to service provider terminal 110. As shown, service provider terminal 110 may include a processor 210, an input/output ("I/O") device 220, a memory 230 containing an operating system ("OS") 240 and a program 250. For example, service provider terminal 110 may be a single server or may be configured as a distributed computer system including multiple servers or computers that interoperate to perform one or more of the processes and functionalities associated with the disclosed embodiments. In some embodiments, service provider terminal 110 may further include a peripheral interface, a transceiver, a mobile network interface in communication with processor 210, a bus configured to facilitate communication between the various components of the service provider terminal 110, and a power source configured to power one or more components of service provider terminal 110.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area network. In some embodiments, a mobile network interface may include hardware, firmware, and/or software that allows processor(s) 210 to communicate with other devices via wired or wireless networks, whether local or wide area, private or public, as known in the art. A power source may be configured to provide an appropriate alternating current (AC) or direct current (DC) to power components.

As described above, service provider terminal 110 may be configured to remotely communicate with one or more other devices, such as computer device 120, authorization terminal 130, merchant database terminal 140, merchant POS terminal 150, and financial service provider terminal 160. According to some embodiments, service provider terminal 110 may be configured to receive real-time authorization request data, batch authorization request data, and batch posted transaction data from authorization terminal 130, merchant data and/or purchase requests from merchant database terminal 140 and/or merchant POS terminal 150, environmental data, location data, and/or purchase requests from computing device 120, and payment authorizations and/or payment credentials from financial service provider terminal 160. In some embodiments, service provider terminal 110 may be configured to transmit messages to computing device 120 that include an indication of a purchase authorization decision and a sequential purchase recommendation.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Service provider terminal 110 may include one or more storage devices configured to store information used by processor 210 (or other components) to perform certain functions related to the disclosed embodiments. In one example, service provider terminal 110 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, service provider terminal 110 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, service provider terminal 110 may include memory 230 that may include one or more programs 250 to perform one or more functions of the disclosed embodiments. Moreover, processor 210 may execute one or more programs 250 located remotely from service provider terminal 110. For example, service provider terminal 110 may access one or more remote programs 250, that, when executed, perform functions related to disclosed embodiments. In some embodiments, one or more programs 250 may be configured to generate a real-time sequential recommendation for a future purchase of goods or services based on the previous transaction of a customer as described in greater detail below.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In some embodiments, memory 230 may include a merchant directory database 260 and a customer profile database 270 for storing related data to enable service provider terminal 110 to perform one or more of the processes and functionalities associated with the disclosed embodiments. Merchant directory database 260 may include stored data relating to known merchants and retailers, such as for example, restaurants, bars, gas stations, stores, taxi services, entertainment venues, and any other such entity that offers goods and/or services for sale. Merchant directory database 260 may include information about these merchants and retailers that includes, for example, hours of operation, street address, cuisine, menus, average expense/check size in dollars, reservation availability, prices of goods and services (e.g., gas price per gallon at a particular gas station), transportation service (e.g., taxi service) wait times based on location, and other such details relevant to the merchant. Further, merchant directory 260 may store one or more categories or subcategories in association with each merchant that provides an indication of the types of goods or services the merchant sells. In some embodiments, each merchant may be associated with one or more categories that include, for example: Dining, Grocery & Drug, General Merchandise, Specialty Retail, Auto & Transportation, Entertainment, Travel, Bills & Utilities, and Other Services. Further, each merchant may be associated with one or more subcategories that include: Bars, Casual Dining, Fine Dining, QSR & Fast Casual, Restaurant Delivery, Supermarkets & Grocery, Convenience & Specialty Markets, Drugstores & Pharmacies, Liquor Stores, Mean & Grocery Delivery, Vitamin & Food Supplements, Wholesale Clubs, Superstores, Department Stores, Non-store Retailers, Auto Parts Stores, Beauty & Cosmetics Stores, Bookstores, Clothing Stores, Craft Stores, Electronics Stores, Footwear Stores, Home Furnishings Stores, Hardware Stores, Jewelry Stores, Music Stores, Office Supplies Stores, Pet Stores, Sporting Goods Stores, Toy Stores, Use & Secondhand Stores, Auto Repair Services, Fuel & Gasoline, Parking, Public Transit, Ridesharing & Taxi, Amusement Parks, App & Digital Content Stores, Attractions & Exhibits, Movie Theaters, Music Streaming, News Subscriptions, Sports Clubs, Theater, Concert & Sports Tickets, TV & Media Streaming, Video Gaming, Airlines, Cruises, Hotel & Lodging, Rental Car, Train, Travel Agencies & Booking Sites, Cable & Internet, Electricity & Gas, Financial Institutions, Insurance (Home, Auto & Renters), Telecom, Water, Home Repair Services, Cleaning Services, Business Services, Charitable Organizations, Child Care Services, Educational Services, Legal & Government Services, Professional Org, Professional Services, Veterinary Services, Laundry Services, Salon & Spa Services, Gyms, Doctor & Medical Services, Health Insurance, and Medical Devices and Goods. It should be understood that the preceding list is merely illustrative and other categories and/or subcategories may be utilized in various embodiments.

Customer profile database 270 may store information relating to one or more customers having an account with a financial services provider, such as a credit card company. For example, customer profile database 270 may store customer segmentation data that represents a plurality of customer segments. A customer segment may be a group of customers having similar demographics that may have similar preferences. For example, service provider terminal 110 may analyze aggregated information about customers such as gender, age, income, average monthly spend using one or more financial accounts (e.g., credit cards), average monthly spend by category, customer spend frequency by category, home zip code, credit score, indications of financial health (e.g., debt, savings, cash flow, etc.), and general spending habits (e.g., whether a customer prefers cheap fast food or expensive fine dining) across a plurality of customer accounts to create a plurality of customer segments that are associated with a set of preferences, such that each customer segment comprises a group of customers with similar demographic characteristics and similar purchasing preferences. Customer profile database 270 may also store customer profile data that is particular to each individual customer. For a particular customer, service provider terminal 110 may determine that, based on the customer's associated customer profile data, the customer is associated with a particular customer segment, and therefore the customer may be associated with a particular set of initial preferences that are predicted to be agreeable to the customer. In some embodiments, customer segmentation data may be obtained through surveys that collect data about customer demographics and preferences. In some embodiments, customer segmentation data may be obtained by service provider terminal 110 performing an analysis of historical transaction data across known customers to correlate attributes or demographics of customers with apparent purchasing preferences.

Service provider terminal 110 may also be communicatively connected to one or more memory devices (e.g., databases (not shown)) locally or through a network. The remote memory devices may be configured to store information and may be accessed and/or managed by service provider terminal 110. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Service provider terminal 110 may also include one or more I/O devices 220 that may comprise one or more interfaces for receiving signals or input from devices and providing signals or output to one or more devices that allow data to be received and/or transmitted by service provider terminal 110. For example, service provider terminal 110 may include interface components, which may provide interfaces to one or more input devices, such as one or more keyboards, mouse devices, touch screens, track pads, trackballs, scroll wheels, digital cameras, microphones, sensors, and the like, that enable service provider terminal 110 to receive data from one or more users (such as via computing device 120).

In exemplary embodiments of the disclosed technology, service provider terminal 110 may include any number of hardware and/or software applications that are executed to facilitate any of the operations. The one or more I/O interfaces may be used to receive or collect data and/or user instructions from a wide variety of input devices. Received data may be processed by one or more computer processors as desired in various implementations of the disclosed technology and/or stored in one or more memory devices.

According to some embodiments, service provider terminal 110 may be configured to generate a real-time sequential recommendation for a future purchase of goods or services based on the previous transaction of a customer as described in greater detail below. According to some embodiments, a sequential recommendation may be a recommendation for a purchase of goods or services that is designed to fulfill an immediate (or closely proximate in time) need or desire of the customer based on the nature of the preceding transaction. For example, service provider terminal 110 may determine, based on data relating to a credit card purchase, that a customer has just checked into a hotel, and because it is known (e.g., via survey data) that it is common for people to have dinner after checking into a hotel, service provider terminal 110 may generate a sequential recommendation to the customer to make a dinner reservation at a nearby restaurant.

According to some embodiments, service provider terminal 110 may base sequential recommendations on the location of the merchant where the previous purchase occurred. In some embodiments, upon receiving authorization request data (e.g., via authorization terminal 130), service provider terminal 110 may process the authorization request data to determine one or more of an address of the merchant where a purchase was made, the identity of the merchant associated with the purchase, and a purchase category associated with the attempted purchase. For example, if a customer uses their credit card to pay for a meal at a restaurant, upon receiving authorization request data relating to the purchase, service provider terminal 110 may determine the identity of the restaurant, the address of the restaurant, and that the purchase category associated with the purchase is, for example, "Dining & Bars→Fine Dining." Service provider terminal 110 may determine a purchase category based on a set of rules that may determine the nature of the transaction based on known data about the merchant and the transaction. For example, if the merchant name is known to be associated with "Dining & Bars," service provider terminal 110 may determine that the transaction has a subcategory of "Fine Dining" (as opposed to for example, "Casual Dining") if the amount of the transaction exceeds a predetermined threshold based on the customer's spending habits. According to some embodiments, authorization request data may include location information associated with the merchant, such as a zip code, a city, a state, and/or a country in which the merchant is located, as well as a merchant name, and based on this data, service provider terminal 110 may determine the address of the merchant by cross-referencing the information received from the authorization request data against a merchant directory listing the names and addresses of known merchants. According to some embodiments, service provider terminal 110 may receive data relating to merchants from third parties, such as a third-party merchant directory or catalog, and may remove irrelevant information from the third-party data and utilize machine learning techniques to determine the address of the merchant. Accordingly, in some embodiments, service provider terminal 110 may determine the address of a merchant corresponding to the authorization request data based on machine learning techniques applied to internal merchant data and/or third-party merchant data. Service provider terminal 110 may determine the distances between the location of the previous purchase (i.e., the location of the merchant of the previous purchase) and the locations of a plurality of merchants in a merchant directory stored by service provider terminal 110 to determine merchants that are nearby to the location of the previous purchase. In some embodiments, if there is more than one instance of a merchant located in one zip code (e.g., multiple instances of the same fast food restaurant), service provider terminal 110 may base a recommendation on the zip code of the merchant location instead of the address. However, in such cases, service provider terminal 110 may determine the address of a merchant having multiple locations within one zip code based on receiving location information from computing device 120 (e.g., such as GPS data from a mobile phone). According to some embodiments, service provider 110 may weight potential recommendations based on proximity to the location of the previous purchase, such that recommendations associated with merchants that are closer to the location of the previous purchase may be more highly prioritized.

According to some embodiments, service provider terminal 110 may base sequential recommendations for a particular customer on a customer segment that service provider terminal 110 has determined that a particular customer belongs to. As described previously above, a customer segment may represent a population of customers that are predicted to have similar preferences based on demographic information such as gender, age, income, average monthly expenditures associated with one or more financial accounts (e.g., credit cards), customer spend frequency based on category, zip code, credit score and spending habits. For example, service provider terminal 110 may determine that a customer segment representing people between the ages of 25-35 may have a high probability of preferring to go to a bar following dinner, whereas a different customer segment representing people between the ages of 55-65 may have a high probability of preferring to go back to their hotel following dinner. Thus, in some embodiments, service provider terminal 110 may generate sequential recommendations for a customer based on a determination that the customer belongs to a particular customer segment that is associated with a set of predicted preferences.

In some embodiments, service provider terminal 110 may utilize machine learning techniques to customize sequential recommendations to particular customers over time, based on indications of whether the customer has accepted or rejected previous rejections. For example, if service provider terminal 110 provided a customer with a sequential recommendation for a purchase at a restaurant, service provider terminal 110 may determine that the customer accepted the recommendation based on receiving data indicating a purchase was attempted by customer at that restaurant within a predetermined amount of time. Conversely, if service provider terminal 110 does not receive data indicating a purchase was attempted by customer at the restaurant within the predetermined amount of time, service provider terminal 110 may determine that the customer rejected the recommendation. According to some embodiments, service provider terminal 110 may track whether the customer made a purchase at (1) the merchant that was the subject of a previous sequential recommendation within the predetermined amount of time, and (2) a different merchant that is associated with the same category or subcategory as the merchant that was the subject of the previous sequential recommendation within the predetermined amount of time. According to some embodiments, service provider terminal 110 may determine that a recommendation was accepted by the customer if the customer engaged in as similar purchasing activity to the one that was recommended, but at a different merchant, which may be determined by tracking purchase categories of purchase made relative to the purchase category of the sequential recommendation. According to some embodiments, if service provider terminal 110 determines that a customer has accepted a previous sequential purchase recommendation, then service provider terminal 110 may provide more weight to future potential sequential recommendations having the same connected category and/or merchant as the previously accepted recommendation.

According to some embodiments, a connected category may refer to a category/subcategory associated with one transaction of a pair of transactions that are sequentially linked as a connected category purchase pair. In some embodiments, a connected category purchase pair may include a first category, which may be referred to as the trigger category, and a second category, which may be referred to as the connected category. An example of a connected category purchase pair may include a trigger category of "Travel→Hotel & Lodging" with a connected category of "Dining & Bars→Fine Dining," which may represent a pair of sequential purchases with the first purchase occurring at a hotel and a second purchase occurring at a fine dining restaurant, wherein the second purchase sequentially follows the first purchase in a list of purchases associated with a financial account used to make the purchases.

Figure 4:
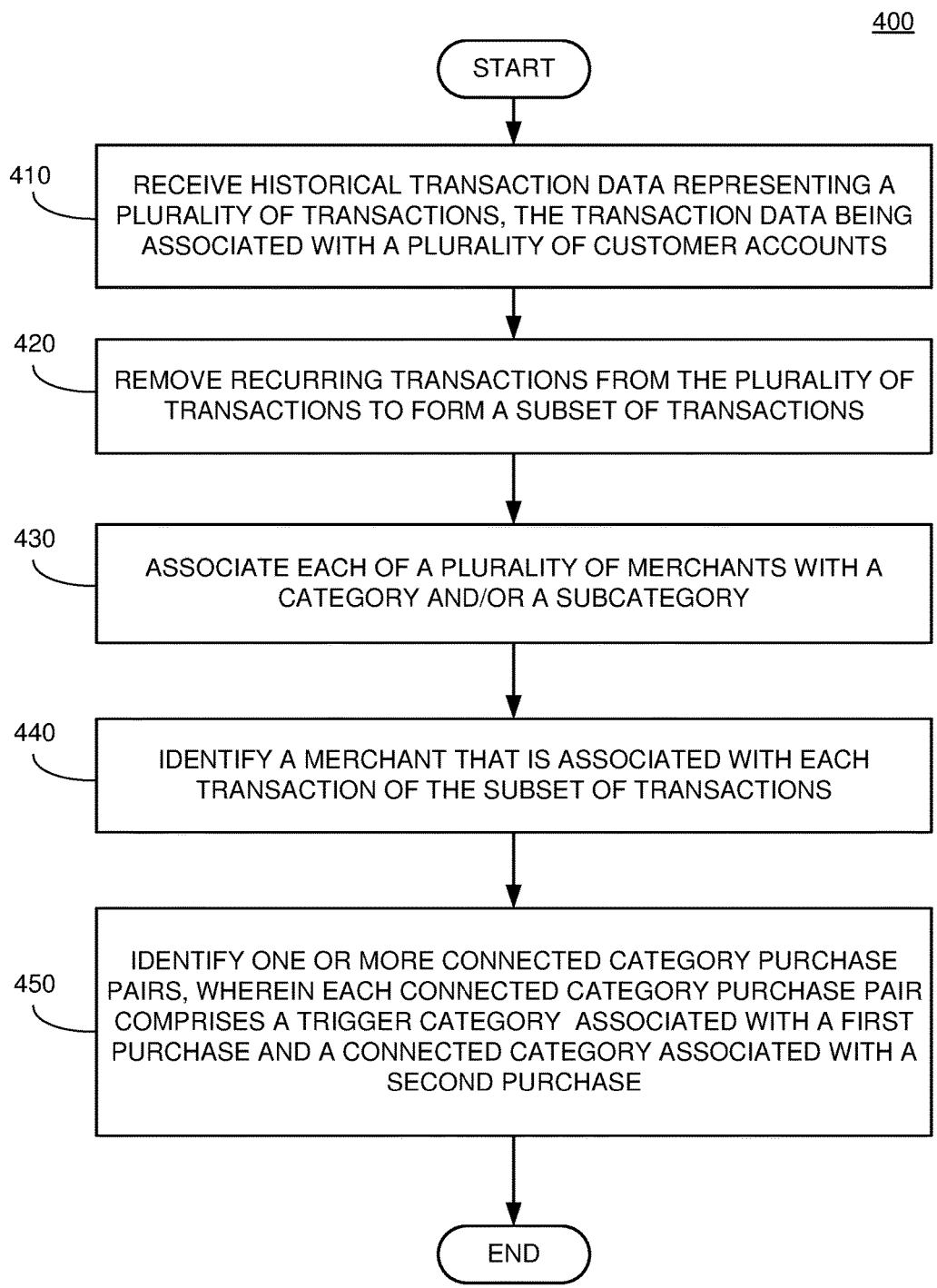
FIG. 4 is a flowchart of an exemplary method for generating a plurality of connected category purchase pairs.

Service provider terminal 110 may generate a plurality of connected category purchase pairs by, for example, analyzing historical transaction data from a plurality of customer accounts over a predetermined period, such as the previous six months. In some embodiments, historical transactions may represent posted transaction data across all or a plurality of customers associated with a financial service provider. For example, historical transaction data may represent posted transactions to credit card accounts for multiple customers of a financial service provider. According to some embodiments, system 100 (e.g., via service provider terminal 110) may perform a method 400 to generate or identify a plurality of connected category purchase pairs, as shown in FIG. 4. In block 410, system 100 (e.g., via service provider terminal 110) may receive historical transaction data representing a plurality of transactions. The plurality of transactions may be associated with a plurality of customer accounts. For example, in some embodiments, the plurality of transactions may include some or all transactions associated with a particular type of credit card issued to a plurality of customers. In block 420, system 100 (e.g., via service provider terminal 110) may remove recurring transactions from the plurality of transactions to form a subset of transactions. For example, service provider terminal 110 may remove recurring such as subscriptions, monthly bills for cable, TV, cell phone plans, mortgages, rent and the like. In some embodiments, service provider terminal 110 may remove transactions that recur on a quarterly or annual basis, such as payment of taxes, insurance, and the like. In this way, service provider terminal 110 may form a subset of transactions that are more likely to represent real-time purchasing decisions made by the customers associated with the accounts. In block 430, system 100 (e.g., via service provider terminal 110) may associate each of a plurality of merchants with a category and/or subcategory, as discussed above. For example, a particular restaurant may be associated with "Dining & Bars→Fine Dining." In block 440, system 100 (e.g., via service provider terminal 110) may identify a merchant that is associated with each transaction of the subset of transactions (e.g., based on historical authorization request data). In other words, for each transaction of the subset of transactions, service provider terminal 110 may determine the identity of the merchant at which the transaction was made. Accordingly, service provider terminal 110 may also associate the category/subcategory of the merchant with the transaction associated with the merchant such that each transaction is associated with a category/subcategory. In block 450, system 100 (e.g., via service provider terminal 110) may identify one or more connected category purchase pairs, wherein each connected category purchase pair comprises a trigger category associated with a first purchase and a connected category associated with a second purchase, wherein the second purchase may immediately follow the first purchase in an ordered list of the purchases associated with a particular account of the subset of transactions. In other words, for each account corresponding to the subset of transactions, service provider terminal 110 may designate the trigger category and the connected category of each sequential pair of transactions as a connected category purchase pair. Accordingly, in some embodiments, service provider terminal 110 may identify a plurality of connected category purchase pairs by identifying pairs of transactions that occur sequentially within a specified duration of one another in association with a particular account and denoting the category associated with the first transaction of the pair as being the trigger category and the category associated with the second transaction of the pair as being the connected category.

According to some embodiments, service provider terminal 110 may prioritize the identified connected category purchase pairs by ranking the connected category purchase pairs based on a weighting of (1) survey data indicative of customer preferences and/or (2) the historical transaction data. For example, if survey data indicates that 90% of people prefer to go to a restaurant after checking into a hotel, connected category purchase pairs representing the sequential purchases of a hotel check-in followed by dining at a restaurant may be highly weighted by the system. Similarly, in some embodiments, service provider terminal 110 may provide a greater weight to connected category purchase pairs that occur more frequently than others within the historical transaction data over the specified period of time. According to some embodiments, service provider terminal 110 may prioritize the connected category purchase pairs by ranking them in order of most significant to least significant, where connected category purchase pairs having higher weightings based on survey data indicative of customer preferences and more frequently occurring in the historical transaction data may tend to be more highly prioritized.

Following the determination of a set of connected category purchase pairs, service provider terminal 110 may generate a set of potential sequential purchase recommendations based on authorization request data received in association with a recent purchase attempt made by the customer. Service provider terminal 110 may receive and process the authorization request data to generate attempted purchase data, which may include information such as the transaction value in dollars, a time stamp corresponding to the time of the attempted purchase, a merchant name associated with the merchant associated with the attempted purchase, an address associated with the attempted purchase and/or merchant associated with the attempted purchase, zip code, city, and country associated with the attempted purchase, and one or more merchant categories and subcategories associated with the merchant associated with the purchase. Based on the attempted purchase data, service provider terminal 110 may determine a purchase category that is associated with the attempted purchase, an identity of a merchant associated with the attempted purchase, and a merchant location associated with the attempted purchase. The purchase category may represent the category and/or subcategory that relates to the nature of the purchase or the merchant at which the purchase was made. For example, the purchase category may be "Travel" if a purchase was made at a hotel or "Dining & Bars" if a purchase was made at a restaurant. Service provider terminal 110 may generate a set of potential sequential recommendations by identifying a subset of the previously identified connected category purchase pairs that have a trigger category that corresponds to the purchase category associated with the purchase. For example, if the purchase category of the purchase is "Travel→Hotel & Lodging," service provider terminal 110 may identify a group of the connected category purchase pairs having "Travel→Hotel& Lodging" as the trigger category as the subset, which may represent the connected category purchase pairs that may be used in generating potential sequential purchase recommendations.

According to some embodiments, service provider terminal 110 may rank or assign probabilities to the subset of connected category purchase pairs based on one or more of the subcategories associated with each connected category, the customer profile, and the customer segment associated with the customer. For example, service provider terminal 110 may rank the subset of connected category purchase pairs based on the frequency with which connected category purchase pairs including the subcategory associated with the connected category appear in the historical transaction data. In some embodiments, if the customer profile indicates a preference for one subcategory over another, then service provider terminal 110 may weight the rankings based on the customer preference. Similarly, service provider terminal 110 may weight the rankings of the connected category purchase pairs based on preferences associated with a customer segment that a particular customer is associated with. In some embodiments, service provider terminal 110 may rank the subset of connected purchase pairs by weighting each of connected category purchase pair of the subset based on time stamp of the recent purchase and historical temporal trends, survey data, or preferences associated with a segment. For example, if the connected categories to a "Travel→Hotel & Lodging" trigger category include "Dining & Bar→Fine Dining" and "Dining & Bars→Bars/Alcohol" and the time stamp associated with a recent purchase indicates that the time is noon, service provider terminal 110 may assign a higher weight/probability to "Dining & Bar→Fine Dining" than "Dining & Bars→Bars/Alcohol" because, for example, historical data and/or survey data indicate that a customer is less likely to go to a bar in the middle of the afternoon than at night. In some embodiments, service provider terminal 110 may weight the rankings of the connected category purchase pairs of the subset based on data indicative of whether the customer has accepted recommendations to a similar connected category subcategory in the past by, for example, giving more weight to subcategories associated with previously accepted recommendations.

Service provider terminal 110 may then prioritize or rank the merchants corresponding to a number of the top subcategories based on location. For example, service provider terminal 110 may rank the merchants corresponding to the top two subcategories, which may be "Dining & Bar→Fine Dining" and "Dining & Bars→Bars/Alcohol" by the proximity of the merchants to the purchase location, generating an ordered list of merchants that may correspond to potential sequential purchase recommendations. For example, service provider 110 may identify all of the merchants associated with "Dining & Bar→Fine Dining" and "Dining & Bars-→Bars/Alcohol" within five miles of the address of the merchant at which the recent purchase was made at, and order the list based on the proximity of the merchants to the address of merchant associated with the recent purchase. In some embodiments, service provider terminal 110 may generate a sequential purchase recommendation based on the highest prioritized merchant in the list. In some embodiments, service provider terminal 110 may select a number of the highest prioritized merchants in the list and re-prioritize them based on customer-specific information such as stored customer preferences or historical data regarding whether the customer has accepted or rejected recommendations associated with each merchant in the past. According to some embodiments, service provider terminal 110 may then select the highest prioritized merchant in the re-prioritized list and generate a sequential purchase recommendation based on the selected merchant. Although the preceding example describes ranking merchants by proximity to the recent purchase address and then reranking a subset of those merchants based on customer preferences, it should be understood that in various embodiments the steps of rankings may be reordered (e.g., first rank merchants based on customer preference and then re-rank a subset of top ranked merchants based on proximity) or eliminated, such that a variety of embodiments based on different combinations of rankings and weightings of customer preferences and merchant proximities are contemplated. It should be further understood that in various embodiments, service provider terminal 110 may generate a sequential purchase recommendation be based on different weightings and/or rankings of some or all of any of the aforementioned factors.

Following the selection of a merchant to be the subject of a sequential purchase recommendation, service provider terminal 110 may generate a sequential purchase recommendation that may be transmit to computing device 120 associated with the customer. In some embodiments, the sequential purchase recommendation may be transmit to computing device 120 along with an indication of an authorization decision. For example, shortly after a customer swipes their credit card at a hotel, service provider terminal 110 may send a text message to computing device 120 indicating that the hotel transaction has been authorized and recommending that the customer visit a nearby restaurant for dinner. Although the prior example describes the message being sent in a text message, it will be understood that may be sent using a number of different methods including email, SMS, instant message, chat program, push notification, displayed via a mobile application, automated telephone message, or any other such electronic communication method. Further, in some embodiments, a message may include one or more of a selectable button, link, or image that may be configured to enable the customer to initiate a transaction associated with the sequential recommendation. For example, if the customer receives a sequential recommendation to have dinner at a particular restaurant, the message may include a button, that when selected, is configured to enable the customer to make a reservation at the restaurant.

While service provider terminal 110 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the terminal 110 may include a greater or lesser number of components than those illustrated.

Authorization terminal 130 may have one or more processors 132 and one or more authorization databases 134, which may be any suitable repository for storing authorization rules. According to some embodiments authorization database 134 may also store customer account information including for example, account credentials, account numbers, card information associated with an account (e.g., credit or debit card information), account balances, and the like. Information stored in authorization terminal 130 may be accessed (e.g., retrieved, updated, and added to) via network 105 by one or more devices (e.g., service provider terminal 110) of system 100. Authorization database 134 may store authorization rules that may be applied to incoming purchase requests to generate an authorization decision that indicates whether a particular attempted purchase has been approved or denied. Following the generation of the authorization decision, authorization terminal 130 may transmit a message to merchant POS terminal 150 that includes the authorization decision to inform the merchant of whether the attempted purchase has been authorized. According to some embodiments, authorization rules may be provided to authorization terminal by service provider terminal 110 or financial service provider terminal 160. For example, a financial institution, such as a credit card company, may provide a third-party processor with a set of rules that can be applied to determine whether an attempted purchase made in association with a credit card account should be authorized or not. According to some embodiments, authorization terminal 130 may receive a purchase request including authorization request data from a merchant POS terminal 150 or merchant database terminal 140 in response to a customer initiating an attempted purchase using a financial account, such as a credit card account, debit account, or other electronic payment account. According to some embodiments, authorization request data may include, for example, a name of a merchant, location information associated with the merchant (e.g., zip code, city, state/country), a time stamp associated with the attempted purchase, a transaction value associated with the attempted purchase, and a merchant category and code associated with the attempted purchase. As will be appreciated by those of skill in the art, a merchant category and code (MCC) may be a four-digit number used to classify the merchant by the type of goods or services it provides.

In some embodiments, authorization terminal 130 may transmit the authorization request data to service provider terminal 110 as it is received. In some embodiments, the authorization request data transmitted to service provider terminal 110 may include the authorization decision indicating whether the attempted purchase has been approved or denied. In some embodiments, the functions of receiving the purchase request and determining an authorization decision may alternatively be performed by service provider 110 or financial service provider terminal 160.

In addition to transmitting a real-time stream of authorization request data to service provider terminal 110, authorization terminal may also transmit batches of authorization request data at predetermined times (e.g., daily). In some embodiments, batches of authorization request data may include updated information that was not included in the initial authorization request data that was forwarded to service provider terminal 110 in real time. For example, if a charge to a credit card includes a tip for a waiter, the purchase value indicative of the cost of the purchase that was sent to service provider terminal 110 as part of the real-time authorization request data may not include the tip amount, however, the subsequent batch authorization request data may include that additional information. Further, authorization terminal 130 may transmit batches of posted transactions to service provider terminal 110 at predetermined times indicating the final settlement(s) of one or more transactions after receiving an update from merchant POS terminal 150 or merchant database terminal 140 indicating that a particular transaction has been finalized.

Merchant database terminal 140 may have one or more processors 142 and one or more merchant databases 144, which may be any suitable repository of merchant data. Merchant database terminal 140 may be located at the POS location, off-site at another merchant location, or at a third-party location. Information stored in merchant database terminal 140 may be accessed (e.g., retrieved, updated, and added to) via network 105 by one or more devices (e.g., service provider terminal 110) of system 100. Merchant database 144 may store merchant data, such as information relating to products and services offered by merchants, pricing, quantity, availability, discounts, reviews, and any other such generally available information relating to a merchant's products and services offered for sale. In some embodiments, merchant database 144 may also include location information associated with products and services that identifies the location(s) that a particular product or service is available for purchase. In some embodiments, the location information may include an identification of a particular store, terminal, or kiosk that the product or service may be purchased from. Service provider terminal 110 may be configured to access merchant database terminal 140 to import merchant data into the merchant directory stored by service provider terminal 110.

Merchant POS terminal 150 may have one or more POS devices 152, 154, 156 that may communicate with one or more devices (e.g., computing device 120) of system 100 via network 105. In some embodiments, merchant POS terminal 150 may be configured to process online, remote, and/or in-person transactions on behalf of an associated merchant. In some embodiments, POS devices 152, 154, 156 may be configured to facilitate the process of authorizing an attempted purchase initiated by customer. For example, POS devices may be electronic cash-registers, self-checkout devices, or credit/debit card scanners that are capable of reading a credit/debit card inserted by customer to pay for a purchase. In some embodiments, POS devices 152, 154, 156 may be configured to wirelessly communicate with computing device 120 to detect payment account information and facilitate the process of authorizing a transaction by, for example, detecting electronically stored payment account information, such as an electronically stored credit card number, financial account information, or the like, which may be used to initiate a payment to a merchant.

Figure 3:
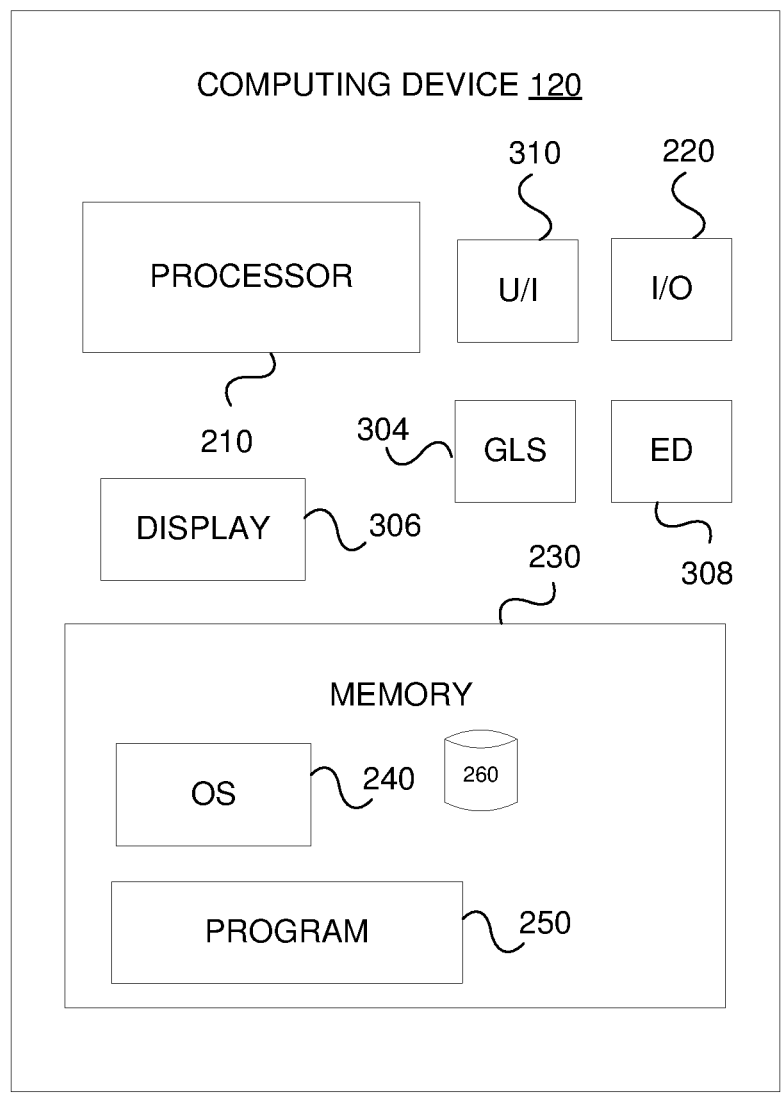
FIG. 3 is a component diagram of an exemplary computing device.

FIG. 3 shows an exemplary embodiment of computing device 120. As shown, computing device 120 may include input/output ("I/O") device 220 for receiving data from another device (e.g., service provider terminal 110), memory 230 containing operating system ("OS") 240, program 250, and any other associated component as described above with respect to service provider terminal 110. Computing device 120 may also have one or more processors 210, a geographic location sensor ("GLS") 304 for determining the geographic location of computing device 120, a display 306 for displaying content such as text messages, images, and selectable buttons/icons/links, an environmental data ("ED") sensor 308 for obtaining environmental data including audio and/or visual information, and a user interface ("U/I") device 310 for receiving user input data, such as data representative of a click, a scroll, a tap, a press, or typing on an input device that can detect tactile inputs. User input data may also be non-tactile inputs that may be otherwise detected by ED sensor 308. For example, user input data may include auditory commands. According to some embodiments, U/I device 310 may include some or all of the components described with respect to input/output device 220 above. In some embodiments, environmental data sensor 308 may include a microphone and/or an image capture device, such as a digital camera.

According to some embodiments, service provider terminal 110 may utilize location and/or environmental data sent by computing device 120 in generating sequential recommendations. For example, in some embodiments, service provider terminal 110 may request location data from computing device 120 after receiving authorization request data to determine if the customer has moved since making a purchase. For example, if a customer pays a bill at a restaurant, the customer may immediately leave the restaurant and begin walking down the street, away from the location of the purchase. According to some embodiments, service provider terminal 110 may utilize the location data provided by computing device 120 (e.g., gathered by GLS 304) in generating a sequential purchase recommendation by using the location data instead of the location of merchant associated with the previous purchase. In some embodiments, service provider terminal 110 may receive information from computing device 120 that is indicative of the customer's desires. For example, ED 308 of computing device 120 may record or detect the customer making an oral statement such as "I'm hungry," and may transmit this information to service provider terminal 110 which may utilize the information by, for example, providing more weight to categories or subcategories related to food service. In some embodiments, computing device may transmit information representative of a user desire to service provider terminal 110 that is detected in written messages on computing device 120, such as text messages, emails, and chat messages and service provider terminal 110 may similarly utilize such information in weighting categories and subcategories.

Figure 5:
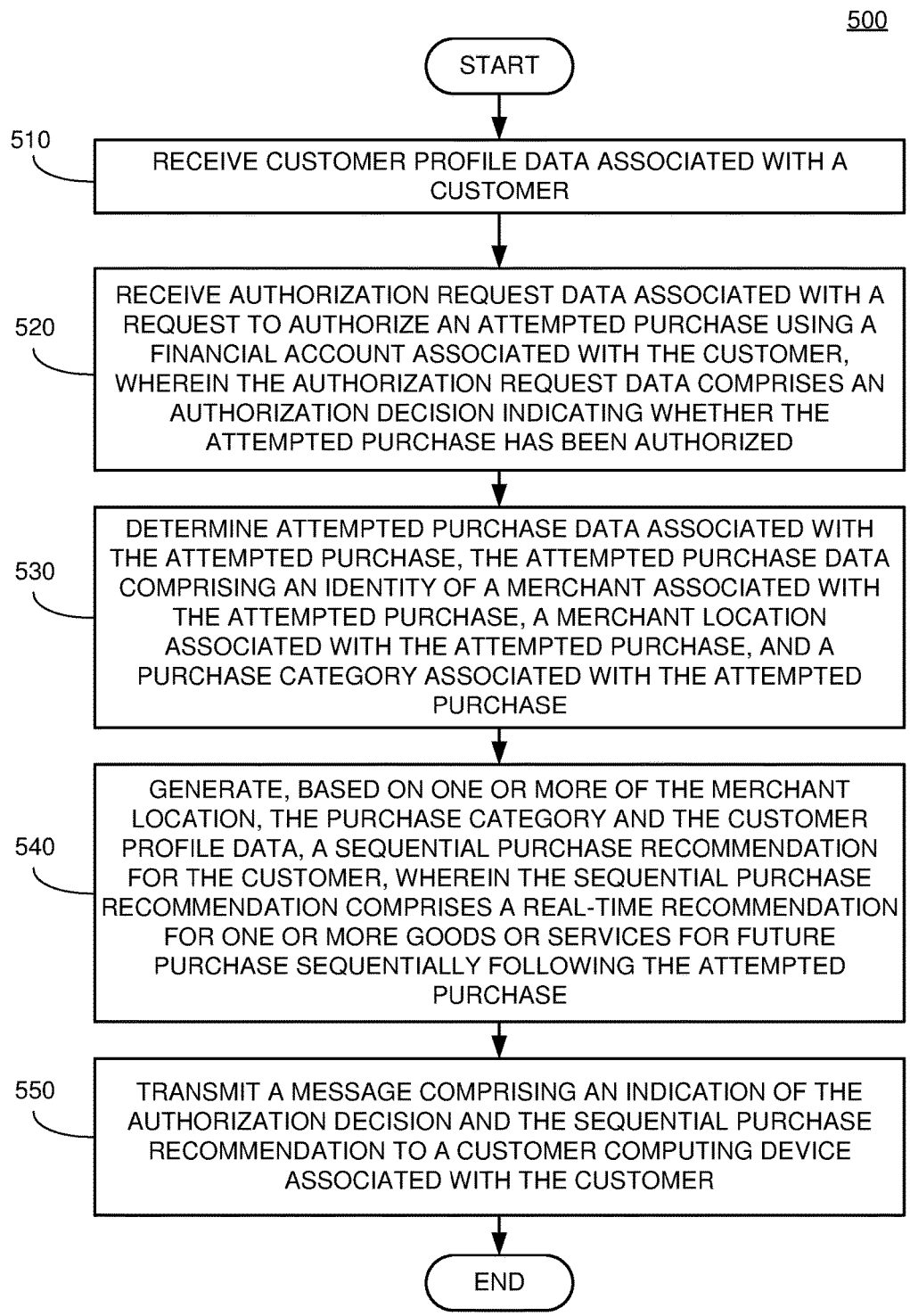
FIG. 5 is a flowchart of an exemplary method for providing a real-time purchase recommendation.

FIG. 5 shows a flowchart of a method 500 for providing a real-time purchase recommendation. Method 500 may be performed by some or all of service provider terminal 110, user device 120, computing device 120, authorization terminal 130, merchant database terminal 140, merchant POS terminal 150, and financial service provider terminal 160.

In block 510, system 100 (e.g., via service provider terminal 110) may receive customer profile data associated with a customer. According to some embodiments, the customer profile data may include one or more of demographic information about the customer, customer preferences, and historical transaction information of the customer. Demographic information may include for example, age, gender, race, profession, income level, home address zip code, indications of financial health, and indications of spending habits. Customer preferences may include user-specified preferences of foods, activities, price ranges, merchants, brands, time frames, and the like. Historical transaction information may include data relating to a plurality of transactions associated with a financial account associated with the customer.

In block 520, system 100 (e.g., via service provider terminal 110) may receive authorization request data associated with a request to authorize an attempted purchase using a financial account associated with the customer. In some embodiments, authorization request data may be received from, for example, an authorization terminal 130. In some embodiments, service provider terminal 110 may receive authorization request data from merchant POS terminal 150. As described above, in some embodiments, authorization terminal may execute stored rules to determine whether the attempted purchase should be authorized and may generate an authorization decision. In some embodiments, the authorization request data may include the authorization decision indicating whether the attempted purchase has been authorized.

In block 530, system 100 (e.g., via service provider terminal 110) may determine, based on the authorization request data, attempted purchase data associated with the attempted purchase. In some embodiments, the authorization request data may include a name associated with the merchant, location information associated with the merchant, a time stamp associated with the attempted purchase, a transaction value associated with the attempted purchase, and a merchant category and code associated with the merchant. According to some embodiments, service provider terminal 110 may generate the attempted purchase data by processing the authorization request data using third party applications. In some embodiments, the attempted purchase data may include an identity of a merchant associated with the attempted purchase, a merchant location associated with the attempted purchase, and a purchase category associated with the attempted purchase.

In block 540, system 100 (e.g., via service provider terminal 110) may generate a sequential purchase recommendation for the customer. According to some embodiments, the generation of the sequential purchase recommendation may be based on one or more of the merchant location, the purchase category, and the customer profile data, as described previously above. In some embodiments, the sequential purchase recommendation may be generated based on the authorization decision. For example, if the attempted purchase was denied because the transaction value exceeded the customer's allowed limit, service provider terminal 110 may provide a sequential recommendation of a merchant that is associated with the same category as the merchant that was the subject of the attempted purchase, but that has a lower average transaction expense associated with it. In some embodiments, the sequential purchase recommendation may be a real-time recommendation for one or more goods or services for future purchase sequentially following the attempted purchase. In some embodiments, one or more goods or services for future purchase in the sequential purchase recommendation are available for purchase within a predetermined amount of time following the attempted purchase. For example, predetermined amount of the time following the attempted purchase is one of 5 minutes, 10 minutes, 15 minutes, 20 minutes, 30 minutes, or one hour, or any other time that is specified by an operator of system 100 or input as a preference by the customer. Accordingly, in some embodiments, the method may include receiving a user selection of the predetermined amount of time for the sequential purchase recommendation from computing device 120.

In block 550, system 100 (e.g., via service provider terminal 110) may transmit a message comprising an indication of the authorization decision and the sequential purchase recommendation. In some embodiments, the sequential purchase recommendation may be sent to a computing device associated with the customer independently of the indication of the authorization decision. In some embodiments, service provider terminal 110 may transmit the message to a customer computing device associated with the customer, such as computing device 120. For example, as described above, the customer may receive a text message informing them that their purchase has been approved and recommending that they have dinner at a nearby restaurant. In some embodiments, system 100 may enable the customer to act on the recommendation by causing the customer computing device to display one or more of a selectable button, a selectable icon, and a selectable link associated with the sequential purchase recommendation that may enable the customer to make a selection indicating acceptance of the recommendation. Accordingly, in some embodiments, service provider terminal 110 may receive, from the customer computing device, a sequential purchase selection in response to selection of one or more of the button, the icon, and the link and may send a purchase request to initiate an attempted sequential purchase. For example, if the sequential purchase recommendation includes a button configured to enable the customer to make a reservation at a recommended restaurant, upon selection of the button by the customer, system 100 may interact with a server associated with the restaurant to make the reservation on behalf of the customer. According to some embodiments, system 100 may track acceptance of a sequential purchase recommendation by noting such a user selection, or may alternatively determine that the sequential purchase recommendation has been accepted by receiving authorization request data associated with a transaction at the recommended merchant within a predetermined period of time of making the recommendation. In some embodiments, upon receiving an indication that the customer has accepted or rejected the sequential purchase recommendation, service provider terminal 110 may update the customer profile data based on the acceptable or rejection of the sequential purchase recommendation. Service provider terminal 110 may apply machine learning techniques to the observed acceptances and rejections of previous sequential purchase recommendations to customize future sequential recommendations to the customer based on the customer's past behavior.

Figure 6:
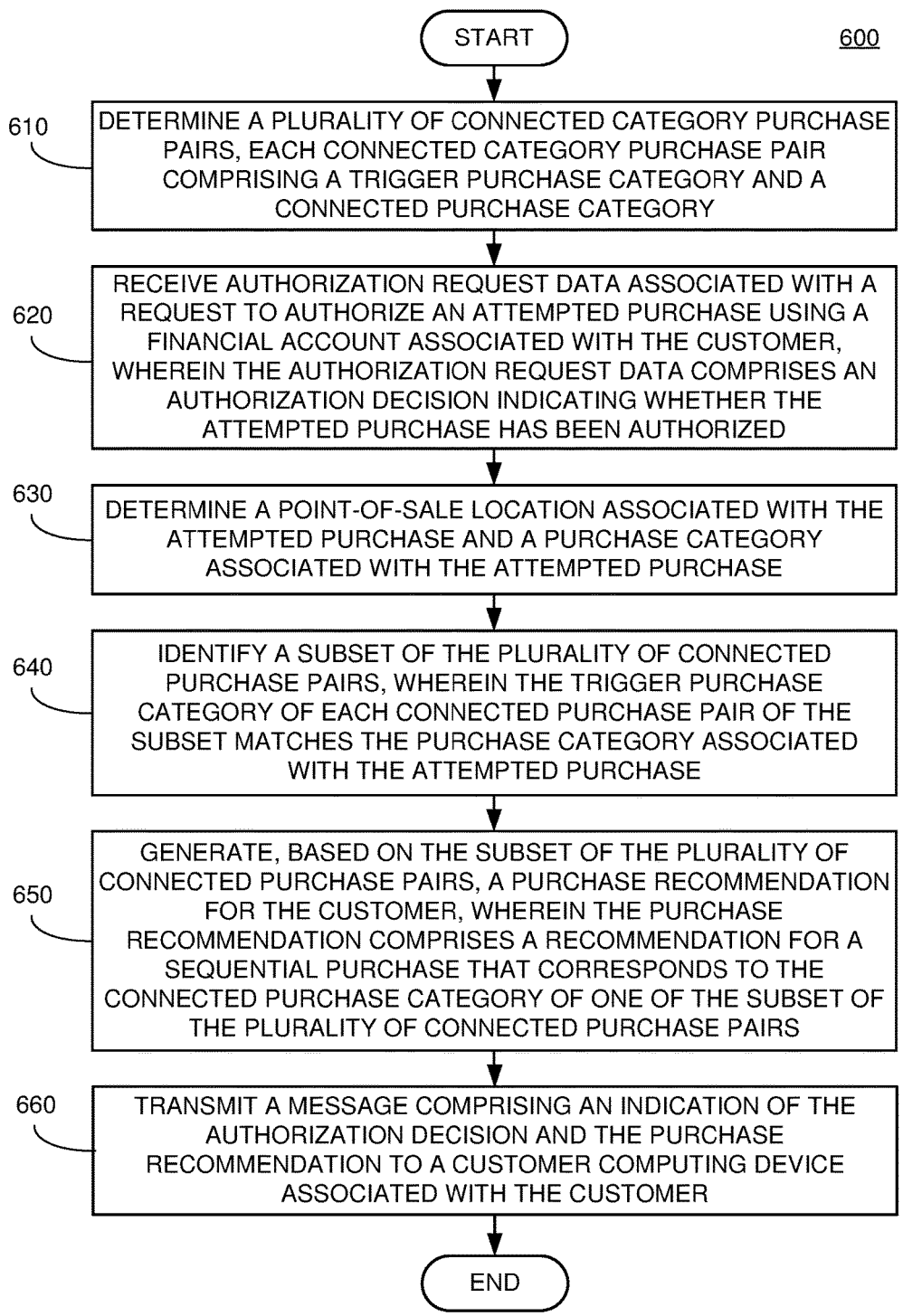
FIG. 6 is a flowchart of another exemplary method for providing a real-time purchase recommendation.

FIG. 6 shows a flowchart of a method 600 for providing a real-time purchase recommendation. Method 600 may be performed by some or all of service provider terminal 110, computing device 120, authorization terminal 130, merchant database terminal 140, merchant POS terminal 150, and financial service provider terminal 160.

In block 610, system 100 (e.g., via service provider terminal 110) may determine a plurality of connected category purchase pairs. In some embodiments, each connected category purchase pair may include a trigger purchase category and a connected purchase category, wherein the connected purchase category may represent a category of goods or services that has a certain probability of being purchased within a predefined proximity of time from a purchase that was made by a customer corresponding to the trigger category. According to some embodiments, determining a plurality of connected category purchase pairs may include receiving, historical transaction data associated with financial accounts of a plurality of customers, creating a subset of historical transaction data by removing recurring transactions from the historical transaction data, classifying each transaction of the subset of historical transaction data by one or more of a category and a subcategory representing the type of transaction, determining the identifications of the merchants associated with each transaction in the subset of historical transaction data, and determining pairs of connected transactions by identifying pairs of transactions that occur within a predetermined duration of one another and designating the category of a first transaction of each pair as being a trigger category and a second transaction of each pair as a being a connected category. According to some embodiments, connected transactions that occur less than a threshold number of times in the subset of historical transaction data may be eliminated by service provider terminal 110 before determining the plurality of connected category purchase pairs. In some embodiments, the connected purchase category of each of the subset of the plurality of connected purchase pairs may be associated with one or more merchant locations and generating a purchase recommendation may be based on the proximity of the point-of-sale location to the one or more merchant locations. For example, merchant locations that are closer to the point-of-sale location may be more likely to be selected by service provider terminal 110 to be the subject of a purchase recommendation.

In block 620, system 100 (e.g., via service provider terminal 110) may receive authorization request data associated with a request to authorize an attempted purchase using a financial account associated with the customer. In some embodiments, service provider terminal 110 may receive the authorization request data from authorization terminal 130. According to some embodiments, the authentication request data may include an authorization decision indicating whether the attempted purchase has been authorized.

In block 630, system 100 (e.g., via service provider terminal 110) may determine a point-of-sale location associated with the attempted purchase and a purchase category associated with the attempted purchase. In some embodiments, service provider terminal 110 may determine the point-of-sale location based on the authorization request data. As previously described above, service provider terminal 110 may process the authorization request data to determine an address associated with the merchant at which the attempted purchase was made by the customer. The purchase category associated with the attempted purchase may represent the nature of the types of goods and services sold at the merchant associated with the attempted purchase.

In block 640, system 100 (e.g., via service provider terminal 110) may identify a subset of the plurality of connected category purchase pairs. In some embodiments, service provider terminal 110 may identify a subset of the plurality of connected category purchase pairs that have a trigger purchase category that matches the purchase category associated with the attempted purchase.

In block 650, system 100 (e.g., via service provider terminal 110) may generate a purchase recommendation for the customer. According to some embodiments, the purchase recommendation may be generated based on the subset of the plurality of connected purchase pairs. For example, in some embodiments, service provider terminal 110 may select one of the subset of the plurality of connected purchase pairs to be the subject of the recommendation to the customer. For example, if the selected purchase pair has "Dining & Bars→Fine Dining" as its connected category, service provider terminal 110 may generate a recommendation for the customer to make a purchase at a particular merchant that is associated with the "Dining & Bars→Fine Dining" category, such as a particular restaurant. Accordingly, in some embodiments, the purchase recommendation may be a recommendation for a sequential purchase that corresponds to the connected purchase category of one of the subset of the plurality of connected purchase pairs.

In some embodiments, method 600 may include determining, for each of the plurality of the connected category purchase pairs, a likelihood that following a first purchase corresponding to the trigger purchase category of the connected purchase pair made using the financial account associated with the customer, that a second purchase corresponding to the connected purchase category of the connected purchase pair will be sequentially made using the financial account associated with the customer and prioritizing each of the plurality of the connected purchase pairs based on the determined likelihoods. According to some embodiments, generating the purchase recommendation for the customer may include selecting the highest priority connected category purchase pair of the subset of the plurality of connected purchase pairs. In some embodiments, prioritizing each of the plurality of connected category purchase pairs may be based on customer profile data associated with the customer, wherein the customer profile data includes one or more of merchant preferences, home address zip code, financial health information, and spending habit data.

In block 660, system 100 (e.g., via service provider terminal 110) may transmit a message comprising an indication of the authorization decision and the purchase recommendation to a customer computing device associated with the customer in a manner similar to that described above with respect to block 550.

Figure 7:
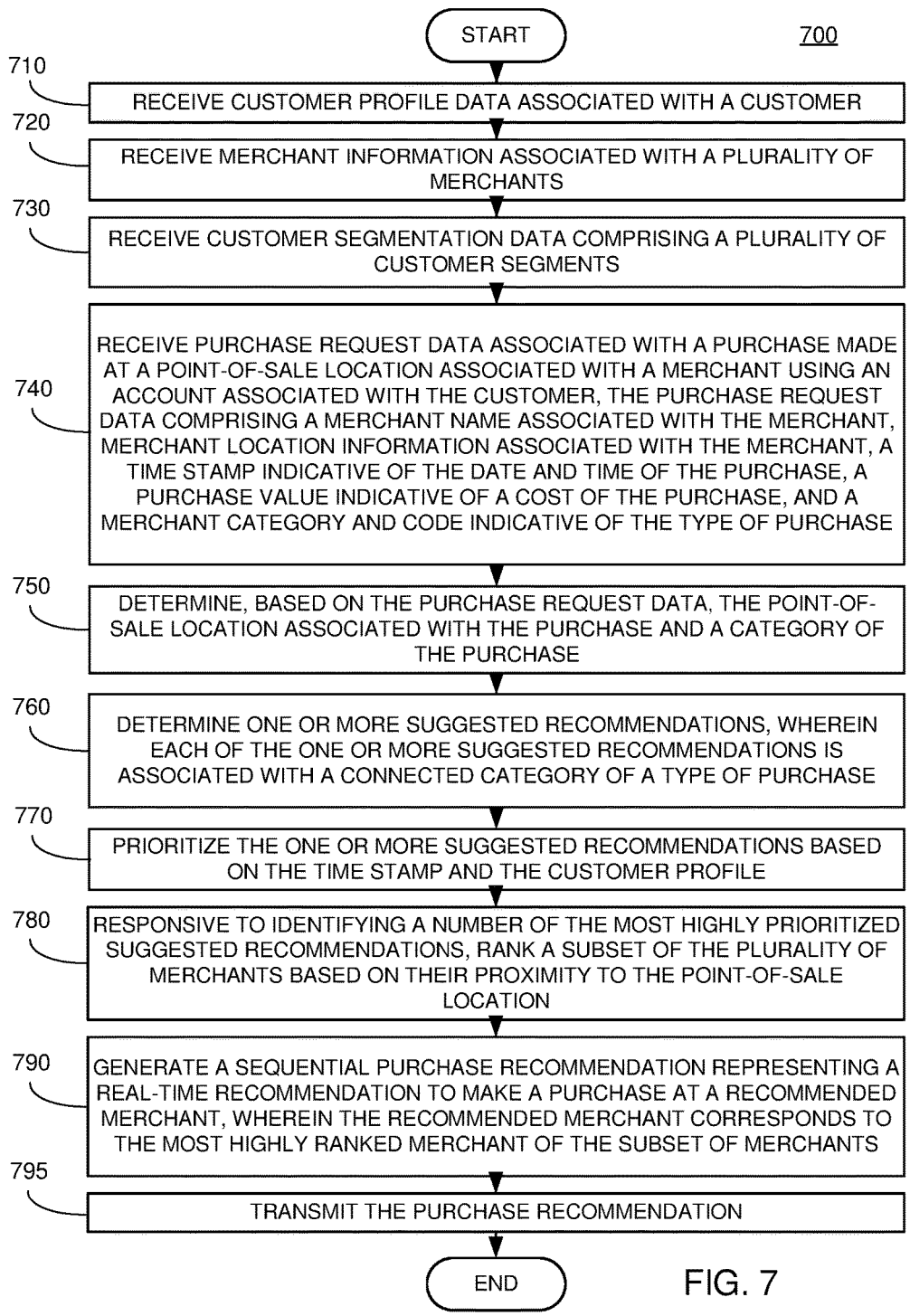
FIG. 7 is a flowchart of another exemplary method for providing a real-time purchase recommendation.

FIG. 7 shows a flowchart of a method 700 for providing a real-time purchase recommendation. Method 700 may be performed by some or all of service provider terminal 110, computing device 120, authorization terminal 130, merchant database terminal 140, merchant POS terminal 150, and financial service provider terminal 160.

In block 710, system 100 (e.g., via service provider terminal 110) may receive customer profile data associated with a customer. According to some embodiments, the customer profile data may include demographic information about the customer.

In block 720, system 100 (e.g., via service provider terminal 110) may receive merchant information associated with a plurality of merchants. In some embodiments, service provider terminal 110 may store a merchant directory including such merchant information as previously described above. For example, in some embodiments, merchant information may include, with respect to each merchant of the plurality of merchants, one or more of an address, goods and services for sale, a menu, average purchase in dollars, reservation availability, prices, and wait times for service.

In block 730, system 100 (e.g., via service provider terminal 110) may receive customer segmentation data comprising a plurality of customer segments. According to some embodiments, each customer segment may represent a particular customer demographic and spending habits associated with the particular customer demographic.

In block 740, system 100 (e.g., via service provider terminal 110) may receive purchase request data associated with a purchase made at a point-of-sale location associated with a merchant using an account associated with the customer. In some embodiments, the purchase request data may include a merchant name associated with the merchant, merchant location information associated with the merchant, a time stamp indicative of the date and time of the purchase, a purchase value indicative of a cost of the purchase, and a merchant category and code indicative of the type of purchase.

In block 750, system 100 (e.g., via service provider terminal 110) may determine the point-of-sale location associated with the purchase and a category of the purchase based on the purchase request data. For example, service provider terminal 110 may determine an address of the point-of-sale location based on the purchase request data.

In block 760, system 100 (e.g., via service provider terminal 110) may determine one or more suggested recommendations based on the category of the purchase. According to some embodiments, each of the one or more suggested recommendations may be associated with a connected category of a type of purchase.

In block 770, system 100 (e.g., via service provider terminal 110) may prioritize the one or more suggested recommendations based on the time stamp and the customer profile. According to some embodiments, prioritizing the one or more suggested recommendations may include associating the customer with a particular customer segment based on the customer profile data and determining priorities of the one or more suggested recommendations based on preferences associated with the particular customer segment.

In block 780, in response to identifying a number of the most highly prioritized suggested recommendations, system 100 (e.g., via service provider terminal 110) may rank a subset of the plurality of merchants based on their proximity to the point-of-sale location. According to some embodiments, each of the subset of the plurality of merchants may offer goods or services that correspond to the connected category of the type of purchase associated with the number of the mostly highly prioritized suggested recommendations. According to some embodiments, the number of the most highly prioritized suggested recommendations may be 1, 2, 3, 4, or 5. In some embodiments, the number may be specified by an operator of system 100 or may be specified by user-input and stored as a preference in the customer profile data.

In block 790, system 100 (e.g., via service provider terminal 110) may generate a sequential purchase recommendation that may represent a real-time recommendation to make a purchase at a recommended merchant. According to some embodiments, the recommended merchant may correspond to the most highly ranked merchant of the subset of merchants.

In block 795, system 100 (e.g., via service provider terminal 110) may transmit the purchase recommendation to a computing device associated with the customer, such as computing device 120 in a manner similar to that described above with respect to block 450.

According to some embodiments, service provider terminal 110 may receive an indication of the customer's acceptance or rejection of the purchase recommendation sent in block 695 and may update the customer profile data based on the acceptance or rejection of the purchase recommendation. According to some embodiments, prioritizing the one or more suggested recommendations further may further comprise, responsive to determining that a suggested recommendation is associated with a connected category of a type of purchase that was previously recommended and accepted following a previous purchase having a category that matches the category of the purchase, weighting the prioritization of the suggested recommendation to provide a higher likelihood of a higher priority.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following exemplary use cases describe examples of a typical user flow pattern. They are intended solely for explanatory purposes and not in limitation. A person may travel to a city that they have never been to before and may be generally unfamiliar with the restaurants and other surrounding businesses. Upon checking into the hotel, the person may use a credit card to pay for a deposit on the room. In response to swiping the card, the hotel (e.g., merchant POS terminal 150) may send an authorization request to be processed (e.g., via authorization terminal 130). The system (e.g., authorization terminal 130) may process the authorization request and determine that the transaction is authorized and may send a message back to the hotel indicating that the transaction is authorized. The system (e.g., service provider terminal 110) may also process the authorization request to determine the address of the hotel and the nature of the transaction. Based on the location of the hotel and the nature of the transaction, the system (e.g., service provider terminal 110) may utilize predetermined purchase pair relationships to generate a recommendation for a next purchase for the customer. For example, based on survey data or an analysis of connected purchase pairs from historical transaction data, the system may know that 80% of people go out to dinner after checking into a hotel, and so the system (e.g., via service provider terminal 110) may generate a recommendation to the person to go to a local restaurant. Recommendations may also be based on preferences indicated by the person and the person's past behavior. For example, if the person rejected a previous recommendation relating to a particular restaurant, the system (e.g., via service provider terminal 110) may give that particular restaurant less weight in the future when determining what the next recommendation will be. The system (e.g., via service provider terminal 110) may provide the recommendation to the person in real time by sending the person a text message or some other form of electronic message. In this way, the system may provide the person with pre-intent recommendations for the person to engage in an activity or purchase that they have a high likelihood of finding to be useful. Accordingly, the system may help the person find new restaurants or other activities of interest that the person may not have considered or otherwise may not even be aware of.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

The invention claimed is:

1. A method of providing a real-time purchase recommendation, the method comprising:
   determining, by a processor of a financial service provider terminal, a plurality of connected category purchase pairs, each connected category purchase pair comprising a trigger purchase category and a connected purchase category;
   receiving, at the processor of the financial service provider terminal and from an authorization terminal and via a network, authorization request data associated with a request to authorize an attempted purchase using a financial account associated with the customer, wherein the attempted purchase is associated with a point-of-sale terminal of a first merchant at a first merchant location and the authorization request data comprises an authorization decision indicating whether the attempted purchase has been authorized;
   determining, by the processor of the financial service provider terminal and based on the authorization request data, a point-of-sale location associated with the first merchant and a purchase category associated with the first merchant;
   responsive to determining that the received authorization decision indicates that the attempted purchase has been authorized:
      identifying, by the processor of the financial service provider terminal, a subset of the plurality of connected category purchase pairs, wherein the trigger purchase category of each connected purchase pair of the subset matches the purchase category associated with the attempted purchase;
      generating, by the processor of the financial service provider terminal and based on the subset of the plurality of connected purchase pairs, a purchase recommendation for the customer, wherein the purchase recommendation comprises a recommendation for a sequential purchase that corresponds to a second merchant at a second merchant location, the second merchant being associated with the connected purchase category of one of the subset of the plurality of connected purchase pairs; and
      transmitting, from the processor of the financial service provider terminal and to a customer computing device associated with the customer and via the network, a first message comprising an indication of the authorization decision and the purchase recommendation; and
   responsive to determining that the received authorization decision indicates that the attempted purchase has not been authorized:
      identifying, by the processor of the financial service provider terminal, a third merchant at a third merchant location, the third merchant being associated with the trigger purchase category and having an average transaction expense that is less than an average transaction expense of the first merchant;
      generating, by the processor of the financial service provider terminal, an alternative purchase recommendation for the customer, wherein the alternative purchase recommendation comprises a recommendation for a sequential purchase that corresponds to the third merchant at the third merchant location; and
      transmitting, from the processor of the financial service provider terminal and to the customer computing device associated with the customer and via the network, a second message comprising an indication of the authorization decision and the alternative purchase recommendation.

2. The method of claim 1, wherein determining the plurality of connected category purchase pairs comprises:
receiving, at the processor of the financial service provider terminal and from a customer profile database, customer profile data comprising historical transaction data associated with the financial account associated with the customer;
creating, by the processor of the financial service provider terminal, a subset of historical transaction data by removing recurring transactions from the historical transaction data;
classifying, by the processor of the financial service provider terminal, each transaction of the subset of historical transaction data by one or more of a category and a subcategory representing a type of transaction associated with each transaction;
identifying, by the processor of the financial service provider terminal, a corresponding merchant associated with each transaction in the subset of historical transaction data;
determining, by the processor of the financial service provider terminal, pairs of connected transactions by identifying pairs of transactions that occur within a predetermined duration of one another and designating the category of a first transaction of each pair as being a trigger category and a second transaction of each pair as a being a connected category; and
eliminating, by the processor of the financial service provider terminal, pairs of connected transactions that occur less than a threshold number of times in the subset of historical transaction data.

3. The method of claim 1, further comprising:
determining, by the processor of the financial service provider terminal and for each of the plurality of the connected category purchase pairs, a likelihood that, following a first purchase corresponding to the trigger purchase category of the connected purchase pair made using the financial account associated with the customer, a second purchase corresponding to the connected purchase category of the connected purchase pair will be sequentially made using the financial account associated with the customer; and
prioritizing, by the processor of the financial service provider terminal, each of the plurality of the connected category purchase pairs based on the determined likelihoods.

4. The method of claim 3, wherein generating the purchase recommendation for the customer comprises selecting the highest priority connected category purchase pair of the subset of the plurality of connected purchase pairs.

5. The method of claim 3, wherein prioritizing each of the plurality of connected category purchase pairs is based on customer profile data associated with the customer, the customer profile data comprising one or more of merchant preferences, home address zip code, financial health information, and spending habit data.

6. The method of claim 1, wherein the connected purchase category of each of the subset of the plurality of connected purchase pairs is associated with one or more merchant locations and wherein generating a purchase recommendation is based on the proximity of the point-of-sale location to the one or more merchant locations.

7. The method of claim 1 further comprising:
receiving, at the processor of the financial service provider terminal and from the customer computing device associated with the customer and via the network, customer location data indicative of a location of the customer computing device,
wherein the purchase recommendation for the customer is based at least in part on the location of the customer computing device.

8. The method of claim 1, wherein the first message further comprises a selectable button, a selectable icon, or a selectable link associated with the purchase recommendation, wherein selection of the one or more of the selectable button, the selectable icon, and the selectable link is indicative of user acceptance of the purchase recommendation, the method further comprising:
receiving, at the processor of the financial service provider terminal and from the customer computing device associated with the customer and via the network, a sequential purchase selection indicative of the selection of the one or more of the selectable button, the selectable icon, and the selectable link; and
responsive to receiving the sequential purchase selection, transmitting, from the processor of the financial service provider terminal and to a merchant server associated with a merchant associated with the sequential purchase selection and via the network, a purchase request to initiate an attempted sequential purchase associated with the sequential purchase selection.

\* \* \* \* \*